United States Patent [19]

Kushner et al.

[11] 4,371,199

[45] Feb. 1, 1983

[54] CRIMPED TUBE JOINT

[75] Inventors: Gerald J. Kushner, Louisville; Edward Raleigh, Fern Creek, both of Ky.

[73] Assignee: General Electric Company, Louisville, Ky.

[21] Appl. No.: 288,962

[22] Filed: Jul. 31, 1981

Related U.S. Application Data

[62] Division of Ser. No. 117,326, Jan. 31, 1980, Pat. No. 4,330,924.

[51] Int. Cl.$^3$ .............................................. F16L 13/14
[52] U.S. Cl. ......................... 285/382.2; 285/DIG. 16; 285/351; 29/458
[58] Field of Search .................... 285/382.2, DIG. 16, 285/171, 351, 382, 382.4, 382.5, 21; 29/458

[56] References Cited

U.S. PATENT DOCUMENTS

| | | | |
|---|---|---|---|
| 2,516,743 | 3/1947 | Allin | 285/163 |
| 3,068,563 | 12/1962 | Reverman | 29/458 |
| 3,149,861 | 9/1964 | Larsson | 285/382.2 X |
| 3,210,102 | 7/1964 | Joslin | 285/374 |
| 3,244,441 | 12/1961 | Caudle | 285/374 |
| 3,556,567 | 1/1971 | O'Connor | 285/382 |
| 3,579,794 | 5/1971 | Powell | 285/382.2 X |
| 3,596,939 | 8/1971 | Gibson | 285/382.2 |
| 3,687,019 | 8/1972 | Wolf | 92/169 |
| 3,784,235 | 1/1974 | Kessler et al. | 285/21 |
| 3,822,464 | 7/1974 | Hester et al. | 29/460 |
| 4,055,359 | 10/1977 | McWethy | 285/39 |
| 4,067,534 | 1/1978 | Frey | 285/319 |

Primary Examiner—Dave W. Arola
Attorney, Agent, or Firm—Frank P. Giacalone; Radford M. Reams

[57] ABSTRACT

A tube joint configuration and method of joining tubing wherein a curable adhesive is arranged on one portion and a resilient sealer is arranged on a second portion on the end portion of the male tube prior to its being telescoped with the female tube. The telescoped portion of the tubes is deformed so that a plurality of spaced grooves is formed containing areas for each of said adhesive and sealer to provide a first and second sealing area.

2 Claims, 6 Drawing Figures

CRIMPED TUBE JOINT

CROSS REFERENCE TO RELATED APPLICATION

This application is a Division of Ser. No. 117,326, filed Jan. 31, 1980 U.S. Pat. No. 4,330,924, issued May 25, 1982, for "Crimped Tube Joint" in the names of Gerald Joseph Kushner and Edward Raleigh and assigned to the assignee of this application.

BACKGROUND OF THE INVENTION

The present invention relates to a tube joint and the method of adhesively joining metal tube ends to be used in conjunction with sealed refrigerant systems. It should be noted, however, that the joint may be employed in other applications requiring fluid tight joints.

The use of adhesive, such as epoxy resin adhesives, for joining metal tubes is well known. For example, U.S. Pat. No. 3,068,563-Reverman discloses a method of joining metal tubes. In accordance with the teachings of the Reverman patent, a first tube or member having a passage therein is prepared to receive a second tube with a small but definite clearance between the two contiguous surfaces. An adhesive such as an epoxy resin is applied either to the exterior of the second tube or to the interior surface of the telescoping passage after which the second tube is inserted into the passage. The first tube or member is then worked to reduce the diameter thereof substantially throughout the extent of the inner tube and at the same time groove or crimp the outer tube or member to mechanically interlock the two components. Finally, the adhesive is heated to curing temperature. It should be noted that the integrity of the joint is arrived at only when the heating and curing of the adhesive is accomplished. Accordingly, this curing procedure must be carried out before the joint is fluid tight to the extent that it may be used in a charged refrigeration system. This requires that, during the manufacturing process, provisions be made so that the joint be heated to cure the adhesive which is both time consuming and expensive.

SUMMARY OF THE INVENTION

An object of the present invention is to provide a joint that allows immediate charging of the refrigerant system. To this end, the present joint provides a first instant seal and a second permanent seal that includes an ambient temperature curable epoxy that will cure subsequent to the first instant seal. The instant seal effectively maintains the integrity of the seal during the curing process of the adhesive.

The present joint comprises a first tube having an end portion dimensioned to receive the end portion of a second tube with radial clearance between the contiguous surfaces to be joined. The second tube member has a first portion coated with an ambient temperature curable adhesive, and a second portion coated with a cured resilient sealer. A plurality of grooves including a pair of axially spaced end grooves and a central groove intermediate the spaced end grooves are dimensioned to reduce the diameter of the first tube to cause it to grip the second tube. A first pocket is formed between one of the end grooves and the central groove that contains the sealer and a second pocket is formed between the other end groove and the central groove that contains the curable adhesive.

DESCRIPTION OF THE PREFERRED EMBODIMENT

Figure 1:
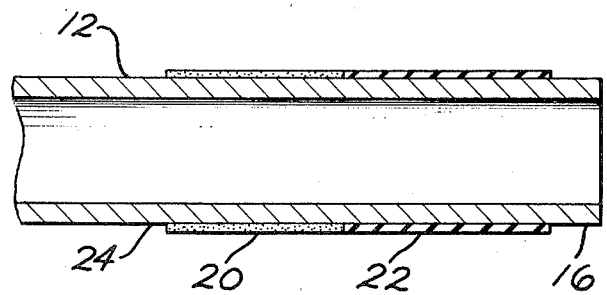
FIG. 1 is a sectional view showing the male member one of embodiments of the joint of the present invention.

Referring now to the drawings, a female tube 10 and a male tube 12 to be joined together to form joint 8 (FIG. 3) of the present invention are, in the present instance, fabricated from aluminum. It should be noted that tubes made from other materials may be employed. Tube 10 is provided with an enlarged end portion 14 which is dimensioned to receive an end portion 16 of the male tube 12. In the present embodiment shown, the inner diameter of tube 10 and the outer diameter of tube 12 are such that the annular clearance between surfaces of the tubes which are contiguous in the completed joint is between 0.020 and 0.030 inches. This radial clearance, as will be explained hereinafter, defines a retaining area 18 into which an adhesive 20 and a resilient sealer 22 are arranged.

In assembling or fabricating the joint 8 prior to insertion of the end portion 16 of tube 12 into the enlarged portion 14 of tube 10, the surface or wall 24 of the portion 16 is provided with coatings of sealer 22 and adhesive 20, as shown in FIG. 1, in the following manner.

The sealer 22 is applied to an area or portion of the outer wall 24 of end portion 16 adjacent its open end. While it is possible that many types of resilient sealers may be employed to provide an effective seal between the metal tubes for the purpose of forming joints, in accordance with this invention, one of the heat-cured silicone rubber products has been employed—more specifically, one manufactured by the General Electric Company and identified as G.E. 6424. The adhesive 20 is applied to an area or portion of the outer wall of end portion 16 adjacent the sealer 22. While it is possible that many types of adhesives may be employed to provide an effective seal between the metal tubes, in accordance with this invention, an ambient room temperature curing epoxy product has been employed—more specifically, one manufactured by the Dexter Corporation and identified as 2 part Hycol 6C. In accordance with the present invention, the sealer 22, arranged adjacent the open end of tube 12, is intended to provide an instant first seal between the tubes while the adhesive 20 provides the second permanent seal after curing. Both the adhesive 20 and sealer 22 may be applied to the tube end 16 in any convenient manner. Preferably, the thickness of each, as applied in the present embodiment shown, is at least equal to or slightly less than the clearance defining the retaining area 18.

Figure 2:
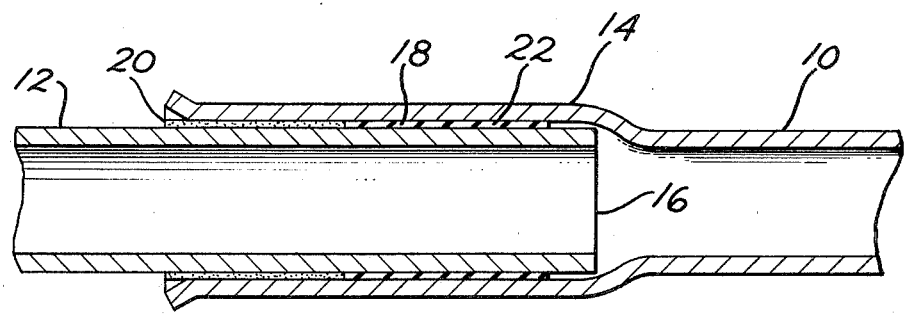
FIG. 2 is a sectional view showing the members telescoped.
Figure 3:
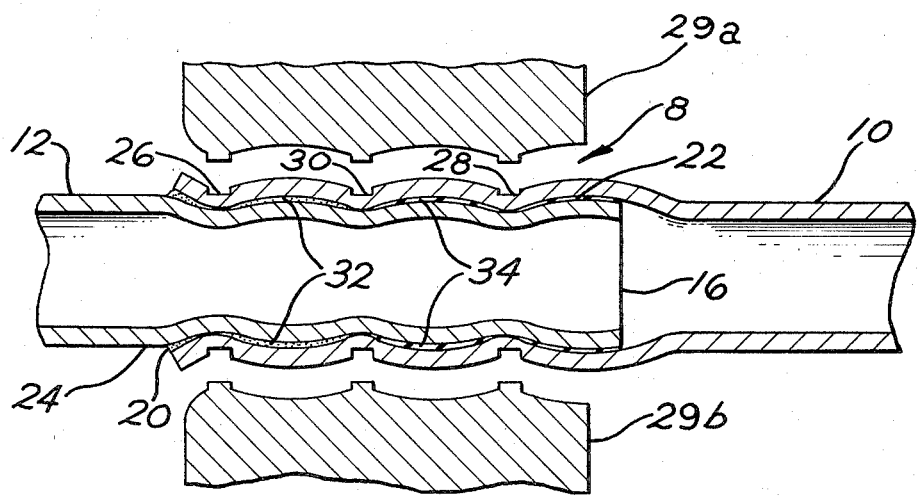
FIG. 3 is an elevational view in section illustrating a completed tube joint formed in accordance with the invention.

The coated end portion 16 of tube 12 is inserted into the sized or enlarged end 14 of tube 10, as shown in FIG. 2. In accordance with this invention, the outer tube is grooved in at least three spaced areas within the region of the joint that is telescoped, as shown in FIG. 3. Two of the grooves 26 and 28 are formed adjacent the longitudinal ends of the telescoped joint portion with the third groove 30 being arranged intermediate thereto. The grooves are annular and are formed by an appropriate crimping and compressing tool, preferably hydraulically operated. The crimping tool, as shown in FIG. 3, may comprise two half dies 29a and 29b, including projections 31 that, when brought together as shown, form annular projections adapted to compress and crimp the tubes 10 and 12 to form the grooves 26, 28 and 30 and annular area or pockets 32 and 34.

The working of the appropriately dimensioned crimping tool is preferably carried to the point where the outer tube 11 lightly grips the inner tube 12 and the layer of adhesive 20 and sealer 22 between the tubes at the grooves is reduced to a thin film. The additional reduction of the outer tube at the grooves 26, 28 and 30 is carried to the extent that it produces actual deformation of the inner tube 12, as shown in FIG. 3. This deformation of the inner tube 12, by grooving the outer tube 11, mechanically interlocks the two tubes and forms three distinct annular seals while, at the same time, dividing retaining area 18 and producing the annular pockets 32 and 34 between the two tubes. The adhesive 20 and sealer 22 are respectively contained in pockets 32 and 34. It should be noted that the adhesive and sealer contained in pockets 32 and 34 are compressed during the forming of the grooves in a manner that effectively eliminates any voids in both of the areas. The radial dimension of retaining area 18 is reduced to provide pockets 32 and 34 having radial dimension of between 0.010 and 0.015 inches. At this time, the sealer 22, both in the groove area 28 and in the pocket 34, provides an effectively sealed joint that is fluid tight and requires no further processing. The integrity of the joint, due to the mechanical interlock of groove 28 and sealer 22 contained in pocket 34, is such that it provides a fluid-tight joint that is effective in holding a refrigerant charge while the ambient curable adhesive 20 is curing.

More specifically, the present invention provides two sealing areas or pockets, one of which 32 is located between the grooves 26 and 30 containing the adhesive 20 and the other 34 located between the grooves 30 and 28 containing the resilient sealer 22.

Figure 4:
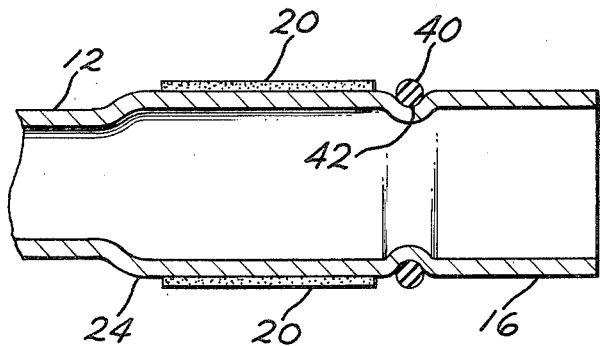
FIG. 4 is a sectional view showing the male member of a second embodiment of the present invention.
Figure 5:
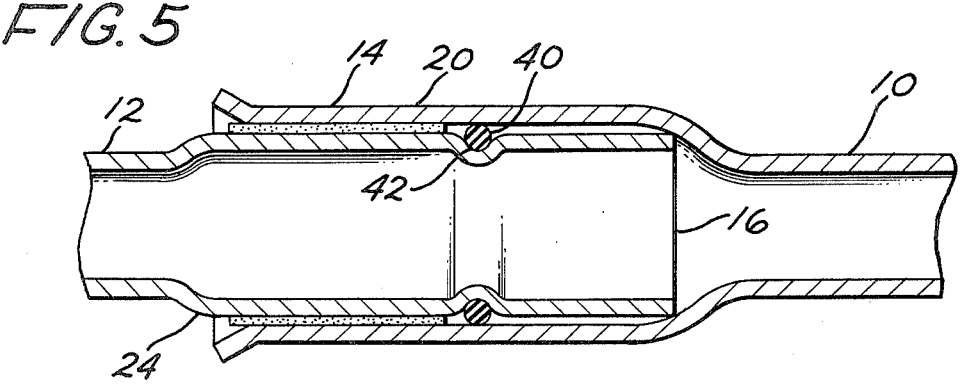
FIG. 5 is a sectional view showing the members of the embodiment of FIG. 4 telescoped.
Figure 6:
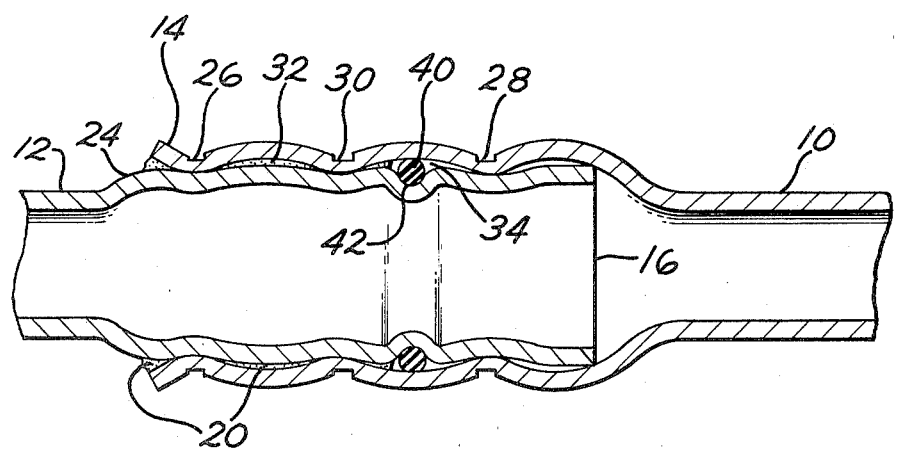
FIG. 6 is an elevational view in sectin illustrating a completed tube joint of the second embodiment of the invention.

In another embodiment shown in FIGS. 4-6, like reference numerals designate like parts throughout the several views. In this embodiment, the initial or first seal is provided by an "O" ring 40 that, in the present instance, was fabricated of "neoprene". An annualar groove or channel 42 is formed in the male portin 12. The channel 42 is positioned longitudinally on the member 12 so that it will be within the pocket 34 in the completed joint, as shown in FIG. 6. The "O" ring is circular in cross section and is dimensioned to extend beyond outer surface 24 of member 12 between 0.012 and 0.017 inches when it is positioned in channel 42, as shown in FIG. 4. The male member 12, including the adhesive 20 and "O" ring 40 shown in FIG. 4, is inserted into and telescoped relative to portion 14 of member 10, as shown in FIG. 5. During the deforming operation, when the grooves 26, 28 and 30 are formed, the "O" ring in pocket 34 is held slightly under compression between the bottom surface of the channel 42 and the inner surface of the female tube 10, the width of the channel being dimensioned to permit the "O" ring to spread laterally cross sectionally, as seen in FIG. 6. Like the embodiment of FIGS. 1-3, the integrity of the joint, due to the mechanical interlock of the groove 28 and "O" ring 40 contained in pocket 34, is such that it provides a fluid-tight joint that is effective holding a refrigerant charge while the ambient curable adhesive 20 is curing. In the embodiment shown in FIG. 6 the annular channel 42 formed in end portion 16 of tube 10 is between the end groove 28 and the central groove 30 of the joint. It should be noted that the groove 42 may be located between grooves 26 and 30 in area 30 with the adhesive 20 arranged in area 34.

In summary, the present joint is used in conjunction with a refrigeration system and, more specifically, with the last or button-up joint of the system. The present button-up joint permits a refrigerant circuit to be completed in place on the assembly line just prior to the system being evacuated and charged with refrigerant. It is desirable that the button-up joint provide a leak-tight seal relative to refrigerant or oil that is effective immediately without the time-consuming additional step of heating the adhesive in the joint to complete the seal. The resilient sealer will provide both an immediate and long-term seal even though it is required to provide an immediate seal and it should be understood that, by the present invention, two effective long-term seals are provided to yield a highly reliable joint that bends with the requirement of mass production.

It should be apparent to those skilled in the art that the embodiment described heretofore is considered to be the presently preferred form of this invention. In accordance with the Patent Statutes, changes may be made in the disclosed apparatus and the manner in which it is used without actually departing from the true spirit and scope of this invention.

What is claimed is:

1. A tube joint comprising:
   a first tube having an end portion dimensioned to receive the end portion of a second tube with radial clearance between the contiguous surfaces to be joined;
   a first portion of the end portion of said second tube being coated with an ambient temperature curable adhesive;
   a second portion of the end portion of said second tube in an area between said adhesive and the free end thereof is provided with a cured resilient sealer;
   a plurality of grooves including a pair of axially spaced end grooves and a central groove intermediate said spaced end grooves being formed in the outer surface of a portion of the first tube that overlaps said second tube, the portion of said first tube which underlies said grooves extending radially inwardly a distance sufficient to reduce the diameter of said first tube and cause said first tube to grip said second tube to reduce to substantially zero thickness the sealer and adhesive beneath said grooves;
   a first pocket located between one of said end grooves and said central groove for containing said sealer to form a first instant sealing area and a second pocket located between the other of said end groove and said central groove for containing said curable adhesive forming a second permanent sealing area after said adhesive has cured.

2. The tube joint recited in claim 1 wherein the radial thickness of said sealer and said adhesive is no more than said radial clearance.

* * * * *